United States Patent [19]

Maloney

[11] Patent Number: 5,048,702

[45] Date of Patent: Sep. 17, 1991

[54] BAKERY RACK

[76] Inventor: William J. Maloney, 29 Montclair Ave., Monsey, N.Y. 10952

[21] Appl. No.: 486,792

[22] Filed: Mar. 1, 1990

[51] Int. Cl.⁵ .............................................. B62B 5/00
[52] U.S. Cl. .................................................. 211/194
[58] Field of Search ............... 211/194, 188, 126, 133; 280/79.3, 47.35; 108/53.1, 91

[56] References Cited

U.S. PATENT DOCUMENTS

| | | | |
|---|---|---|---|
| 3,868,123 | 2/1975 | Berg et al. | 211/194 X |
| 4,217,999 | 8/1980 | Forsman | 211/70.5 X |
| 4,620,637 | 11/1986 | Karashima | 211/188 |

Primary Examiner—Ramon O. Ramirez
Assistant Examiner—Robert A. Olson
Attorney, Agent, or Firm—Ewan C. MacQueen

[57] ABSTRACT

Directed to a transportable rack for handling bakery goods such as bread which is made of moldable plastic, has a base trolley on which are mounted modular stackable shelf units having longitudinally extending parallel side rails adapted to hold bakery goods for transport, and separating members outboard each shelf unit which provide vertical separation between the shelves and transmit the weight of the shelf and its contents downward so that each shelf is light, with the separating members forming a vertical load-bearing and bracing column on each side of the rack.

5 Claims, 2 Drawing Sheets

BAKERY RACK

The present invention is directed to an improved bakery rack useful for temporary storage and transportation of bread and other bakery products.

BACKGROUND OF THE INVENTION

The trend in the bakery industry has been toward large bakery installations designed to serve a large area. This trend has been fostered by the need to achieve economy of scale, and has been achieved in large measure. However, large production of bakery products such as bread in a few centralized bakeries has produced a logistics problem associated with distribution of the bakery products so produced to market. It is necessary that the products be transported from the bakery to distribution centers or to individual stores and that the transportation be smooth, quick and efficient since the shelf life of the products is short.

The transportation problem is complicated by the fact that bakery products are bulky, have low density and are fragile. It has become customary to place bread or other bakery product on pallets which are then shelved in movable racks having multiple shelves. The loaded racks are then placed in trucks for transportation. The racks currently used are made of metal such as steel or aluminum and are welded together with braces for stiffening. It was thought that, in this way, the racks could be made strong enough to withstand the rough handling to which they are subjected on the warehouse floor. Unfortunately, it has been found from experience that no matter how strong and rigid the racks were made, they could be bent or otherwise mangled to the point at which the pallets holding bread or other product would no longer fit on one or more shelves on the rack. This meant that a significant load-carrying capability was lost, a severe economic disadvantage. Another economic disadvantage associated with the current metal racks is that they are many times heavier than the product they were designed to hold for transport, meaning that the trucks designed to haul bread were, as far as the actual load hauled was concerned, merely hauling racks. As the racks became bent or otherwise tortured out of shape to the point where their load-carrying capacity was reduced, further wastage in transport capability occurred. The only way to mitigate the damage to the racks and the associated economic loss was to straighten the racks, an expensive, labor-intensive operation involving the use of welding torches, presses, hammers and the like. It was found that the life of the racks in useful service was undesirably short, particularly having in mind the expense in manufacturing the racks in the first place.

It is apparent that the industry needed a more efficient and less costly way to store and transport bakery products from the ovens to store shelves. The present invention is directed to providing a solution to the problem.

BRIEF STATEMENT OF THE INVENTION

The invention is directed to a bakery rack comprising stackable shelves of modular design and capable of being produced by molding in plastic, preferably a high-impact plastic. The bakery rack comprises a plurality of stackable shelves, each having longitudinally extending side rails, transverse members holding said side rails in spaced, parallel relation, and separating members holding adjacent shelves in spaced vertical relation and acting to transfer downward the weight of the shelf as well as the weight of shelves thereabove; the shelves, when stacked, resting on a base trolley unit. The modular design of the rack permits ready replacement of individual shelves and of the trolley unit in the event of damage in use.

DETAILED DESCRIPTION OF THE INVENTION

Figure 1:
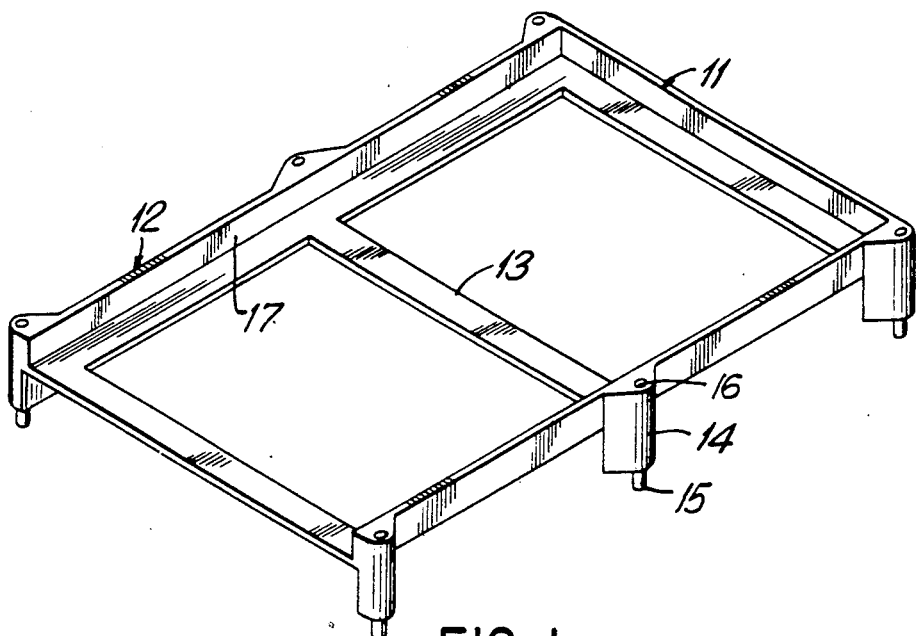
FIG. 1 depicts, in perspective, a shelf unit contemplated in accordance with the invention.

The invention will now be described in conjunction with the drawing in which FIG. 1 depicts a shelf unit 11 consisting of side rails 12 maintained in parallel spaced relation by webs 13 and provided with separators or spacers 14 which maintain shelves 11 in vertical spaced relation when stacked one above the other to form a rack. Separators 14 are located on the outboard faces of rails 12 to provide an unobstructed passage of palletted bakery products onto shelf 14 from the open end thereof. Rail 12 is shown with flat vertical parallel sides 17 which serve as guides for passage of pallets into shelf 11.

Figure 2:
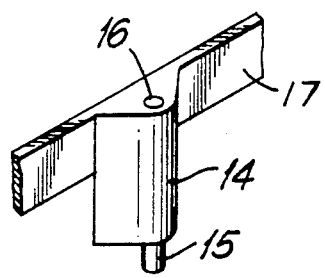
FIG. 2 depicts, in perspective, on a larger scale the special separator or spacer for maintaining the shelf of FIG. 1 in spaced relation in the assembled rack.

FIG. 2 depicts, at an enlarged scale the outboard separator 14 shown in FIG. 1. Separator 14 may be of any convenient length to provide the necessary between-shelf clearance required to accommodate the particular product being transported. Separator 14 may be provided with locating devices such as the illustrated pin-and socket combination shown in FIG. 2 by means of reference numerals 15 and 16, respectively. Shelves 11 are produced in molded plastic, preferably high-impact plastic, to provide a satisfactorily long service life.

Figure 3:
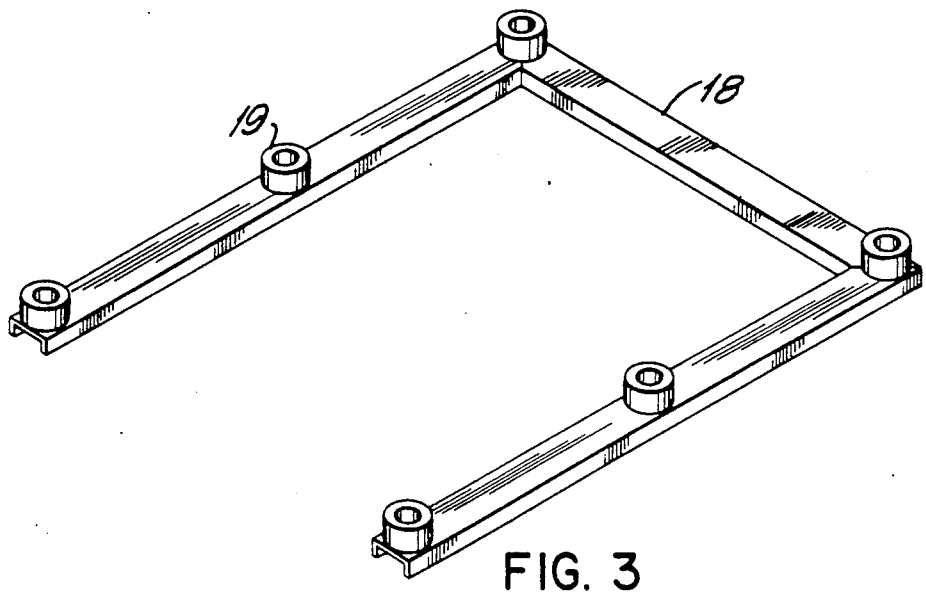
FIG. 3 depicts, in perspective, a trolley unit making the rack of the invention transportable.

FIG. 3 depicts the rack base or trolley 18 which is provided with sockets 19 to receive pins 15 in the shelf immediately registered thereon. Base 18 preferably is made as a channel section to provide strength and as a convenient means of holding caster units. As illustrated in FIG. 3, the base unit may be made in the form of an open U-shape, although supporting and spacing webs may be provided if desired. Preferably, base unit 18 is produced in glass-reinforced plastic, and may be molded, laid-up, or produced from channel section material.

Figure 4:
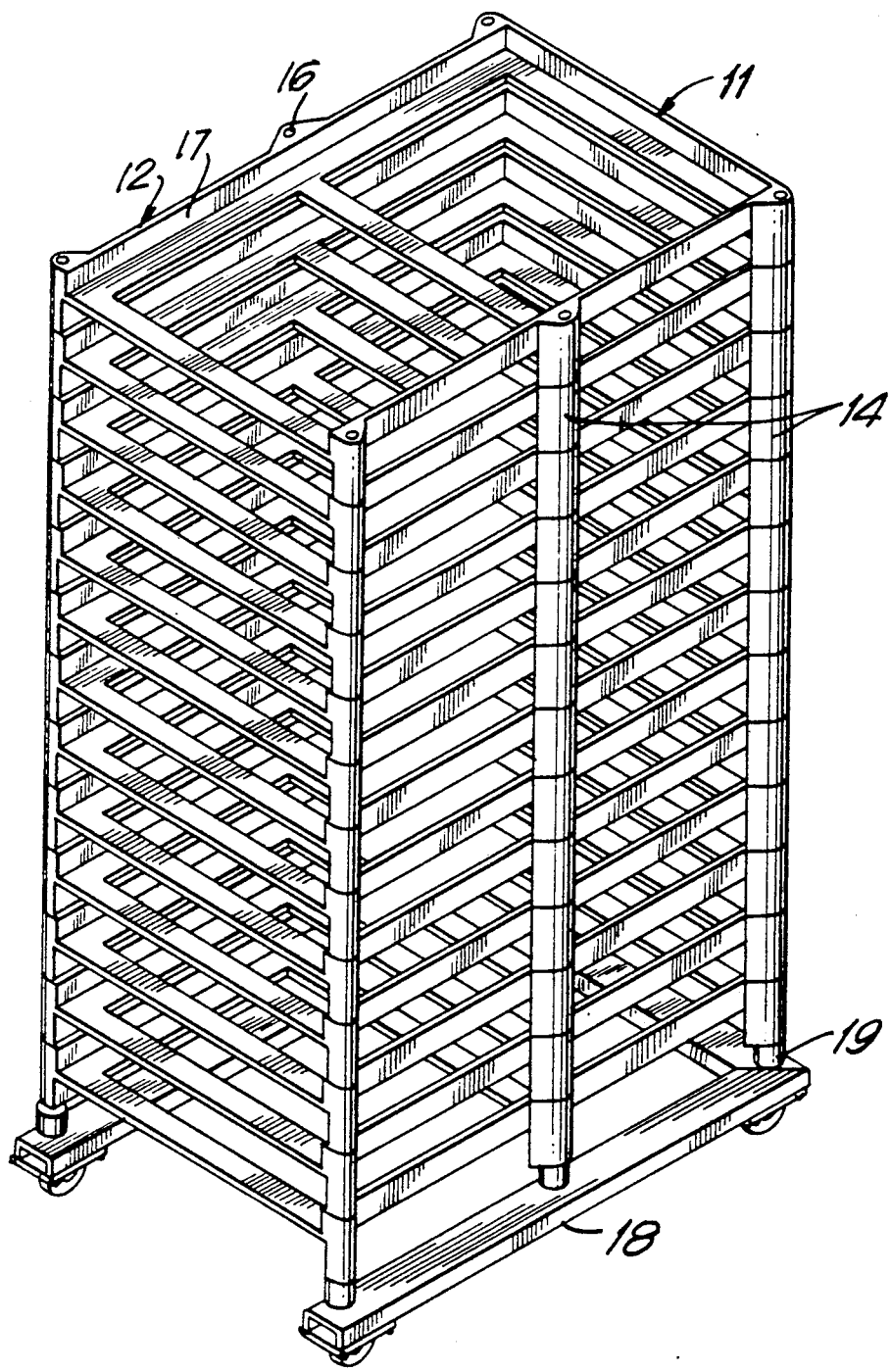
FIG. 4 depicts, in perspective, an assembled rack in accordance with the invention.

FIG. 4 depicts a perspective view of an assembled bakery rack in accordance with the invention. As can be seen therefrom, shelves or trays 11 are arranged in fixed location by separators 14 and may be locked together by means such as the pin-and-socket interlocks illustrated in FIG. 2. A notable feature of the assembled rack is the load transference to rack base or trolley 18 from the individual shelves and their contents. This means that any individual shelf 11 is subjected only to the stresses generated by its own weight and that of the product being stored thereon. This feature means that individual shelves or trays are not unduly stressed in service and may therefore be made of light-section material. It is to be noted that separators 14, when fitted together, as by means of the pin-and-socket illustrated or by other convenient means, form a segmented load-carrying column or vertical brace which transfers the rack weight to trolley 18.

The design features illustrated in the Figures mean that the entire rack assembly can be light so that when the rack is subjected to abuse on the loading floor (an inevitable event) it can bounce away from impacting bodies and thus escape damage in situations where the much heavier racks currently being used would be dented, bent or otherwise deformed. As compared to steel racks, the present bakery rack weighs only about one-sixth as much. It is to be noted that metallic materials will become dented or otherwise deformed when struck by impacting bodies which deliver a force exceeding the elastic limit of the metal. Permanent deformation results. However, the plastic bakery rack of the invention can escape deformation and permanent damage as long as the impacting force is insufficient to cause fracture. Even in that event, the modular design of the present rack permits ready replacement of the broken part. No loss of capacity results, with accompanying economic benefit.

UNIQUENESS OF THE INVENTION

The invention provides the following advantages:
1. The entire assembly is made of light-weight plastic products which are not currently being utilized in the bakery industry.
2. The light-weight plastic material is not malleable and cannot be bent or pounded out of shape.
3. Each section of the rack is removable, permitting individual repair or replacement, and also permitting loading in different parts of the plant, followed by assembly of loaded shelves into a rack for transport.
4. Use of light-weight material in the rack makes the rack weight more compatible with the weight of the material loaded thereon, and results in fuel savings in transport.

I claim:

1. A transportable rack made of moldable plastic and specially adapted for transportation and temporary storage of bakery products comprising a base trolley unit and a plurality of modular shelf units vertically stackable thereon, each of said shelf units comprising longitudinally extending parallel side rails, transverse members holding said side rails in spaced, parallel relation and separating members outboard said side rails at each end and on each side thereof adapted to connect vertically to adjacent, vertically located similar shelf units and said trolley unit while maintaining vertical separation therebetween, said separating members being of enlarged section as compared to said side rails and including locking and locating means to lock said shelf units together in located position when said shelf units are vertically stacked together, said separating members, when vertically stacked, acting to transfer the weight of each said shelf unit downward, and, when vertically stacked, forming a plurality of segmented, vertical load-bearing and bracing columns on each side and each corner of said rack.

2. A transportable rack means in accordance with claim 1 wherein said separating members include pin and socket members adapted to form locating and locking means with adjacent vertically located shelf units.

3. A transportable rack means in accordance with claim 1 wherein said base trolley unit is provided with casters.

4. A transportable rack means in accordance with claim 1 wherein said trolley and shelf units are made of moldable plastic.

5. A transportable rack means in accordance with claim 1 wherein said base trolley unit has the shape of an open U in plan view, has a channel cross-section, has locking and locating means to receive one of said shelf units and is made of glass-reinforced plastic.

* * * * *